Oct. 26, 1937.    A. P. SAHA    2,097,104
HEAT EXCHANGE APPARATUS
Filed Feb. 8, 1936
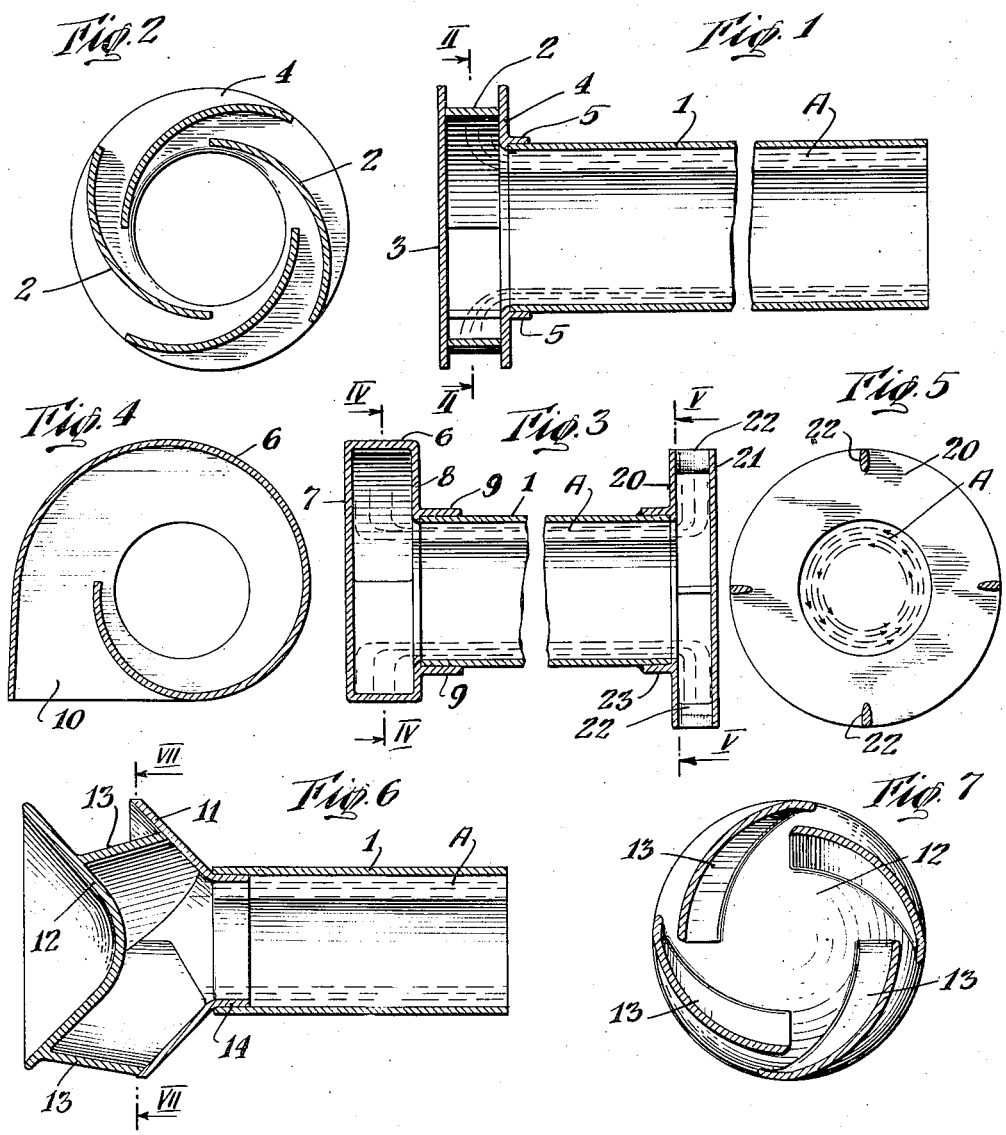
INVENTOR
Aatto P. Saha
BY
Hoguet, Neary & Campbell
ATTORNEYS Patented Oct. 26, 1937

2,097,104

UNITED STATES PATENT OFFICE 2,097,104

HEAT EXCHANGE APPARATUS

Aatto P. Saha, New York, N. Y.

Application February 8, 1936, Serial No. 62,884

8 Claims. (Cl. 257—248)

This invention relates to an apparatus for heat exchange.

An object of my invention is to provide an apparatus for transferring heat between a surface and a fluid, whether a gas, vapor or liquid, in a manner such that a large quantity of heat may be transferred in a relatively short time.

Another object of my invention is to provide an apparatus by which a high rate of heat exchange may be effected between a surface and a fluid with a minimum of frictional resistance.

A further object of my invention is the provision of an apparatus in which the rate of heat exchange may be varied over large ranges.

An additional object of my invention is to provide an apparatus having special utility in heat exchangers of all types employing one or more tubular conduits.

The rate at which heat is transferred between a fluid and a tube is a function of the speed of the fluid through the tube and is approximately directly proportional to the velocity. For a high rate of heat transfer therefore, the fluid should have a high velocity.

The quantity of heat transferred between a fluid and a tube is dependent upon the length of time the fluid contacts the tube.

For example, the quantity of heat transferred will be decreased by decreasing the length of the tube, because for a given velocity the smaller the length of the tube the shorter will be the time of contact of the fluid with the tube. If the velocity is increased, the fluid will contact the walls of the tube for a shorter length of time and a smaller quantity of heat will be transferred. Therefore, in a process in which the fluid is moving through the tube with only an axial velocity, an increase in velocity will decrease the time of contact and in order to obtain the benefits of an increased velocity it is necessary to employ longer tubes.

In my process, in a tube of given dimensions having a given amount of fluid passing through it per unit time, any velocity flow may be employed. Consequently the rate of heat transfer may be increased indefinitely. In addition, the time of contact of the fluid with the tube and velocity of the fluid may be increased simultaneously. The fluid may remain in the tube for a comparatively long time but during this time the velocity of the fluid is relatively high. In my process, the tube may be also relatively short and at the same time a large amount of heat may be transferred due to the increased time of contact and the higher velocity of the fluid as it passes through the shorter tube.

In heat exchangers in which a fluid is passed axially through a tube, the amount of heat transferred is proportional to the extent the fluid contacts the interior periphery of the tube; for example, if a portion of the fluid is flowing through the center of the tube and remains in that position throughout its travel, it will not have contacted the tube wall and will not have had its temperature materially altered. For this reason the rate at which heat is transferred per unit area has been regarded as approximately inversely proportional to the diameter of the tube.

In my process the fluid is caused to pass through the tube in an annular stream contacting the interior periphery of the tube. Therefore, a large proportion of the total volume of the fluid that moves through the tube is in contact with or adjacent the tube surface.

In carrying out my process, I cause the fluid to flow through the tube in the form of a free spiral vortex. Before further describing my process and its application it is desirable to define a free spiral vortex and explain its action.

When a fluid is moving in the form of a free vortex, the product of the radial distance of a particle of fluid from the axis of the vortex and the tangential velocity component of said particle of the fluid at said radial distance is constant.

A cylindrical region called a core, in which there is substantially no axial flow of fluid (through the tube), is formed along the axis of the vortex (within the tube). As a result, the fluid in a vortex moves axially (through the tube) in the form of an annular stream that surrounds the core. The annular stream, having the characteristics of a free vortex previously described, is, in effect, composed of a number of concentric rotating strata, each of which possess progressively different tangential velocity components. The strata also possess progressively different axial velocity components which are greater near the outside of the annular stream. A fluid moving in the form of a free vortex and progressing axially through a tube will also have an axial velocity component and may also have a radial velocity component, or both, in addition to the tangential velocity component. By free spiral vortex is meant that species of a free vortex in which the motion is compounded of two or three of these velocity components in any proportion as long as the tangential velocity component varies inversely as the distance from the axis of the vortex.

The fluid in the core may be a liquid, a vapor or gas. If the fluid being passed through the tube is a gas or vapor, the fluid in the core will be a gas or vapor. If the fluid being passed through the tube is a liquid, the fluid in the core may be either a liquid, or it may be a vapor or gas, depending upon temperature and pressure conditions. The fluid comprising the core will have substantially only a tangential velocity and this varies as the distance from the axis of the core. The fluid in the core will have no substantial axial velocity component. However, the outer portions of the core may have a very slight axial movement imparted thereto because of the drag induced by the contact of the inner portions of the annular stream. It will, therefore, be obvious that practically all of the fluid which moves through the tube, and which is to have its heat content altered, occupies only the outer annular cross-section which contacts the periphery of the inside of the tube.

The rate at which heat is transferred by a fluid moving into contact with the surface is also a function of the centrifugal force developed by a flowing stream and the force with which the fluid is impressed upon the tube surface. The greater this force the thinner will be the relatively stationary film of liquid on the surface generally known as the boundary layer. The centrifugal force developed in the flowing stream of a free spiral vortex is directly proportional to the square of the tangential velocity and inversely proportional to the diameter of the tube. Therefore, in my process the rate of heat transfer may be substantially increased due to the high velocity attainable.

My invention, in addition to being applicable to a convection process in which heat is exchanged between a liquid and a surface, is also applicable to processes of evaporation and condensation. In evaporating a liquid in a tube in which there is an exchange of heat between the tube surface and the liquid to be evaporated or vaporized the rate of heat transfer from the tube surface to the liquid will also be increased due to the action of the centrifugal force causing a displacement of the vapor from the tube surface into the core of the vortex. This is particularly desirable in view of the fact that vapors are comparatively poor conductors of heat and the liquid is always kept in contact with the tube wall and prevents it from being heated to an excessive temperature.

It is possible with my process to cause a liquid to be evaporated from the tube surface at extremely high rates, for example, at a rate such as to cause complete evaporation of the annular liquid stream during its passage through a relatively short tube.

In a free spiral vortex it is possible, by changing the vortex forming means, to vary the diameter of the core and, therefore, to vary the thickness of the annular fluid stream. When the core is relatively large in diameter and the annular stream is relatively thin, the mean tangential velocity component of the fluid will be high as compared with the mean axial velocity component. A decrease in the size of the core with a corresponding increase in the thickness of the annular stream will decrease the mean tangential velocity component and increase the mean axial velocity component. It will, therefore, be seen that the time of contact of the fluid with the surface and the quantity of fluid passing through the tube in the form of a free spiral vortex can be varied by altering the diameter of the vortex core.

A change in the diameter of the core is obtained by changing the adjustment of the mechanical means for forming the vortex. For a vortex having a given core diameter alterations in pressure difference causing a flow through the tube will not alter the diameter of the core. A change in pressure difference will change the absolute velocity of the fluid and will, therefore, alter the quantity of fluid passing through the tube. It will, therefore, be seen that the amount of fluid passing through the tube may be changed by altering the vortex forming means so as to change the diameter of the core; the amount of fluid passing through the tube may also be changed by altering the pressure under which the flow is introduced into the tube; or by altering both.

The free spiral vortex flow in the tubular conduit may be formed by any suitable means. Various modifications of apparatus which may be used in carrying out the process are illustrated in the accompanying drawing which forms a part of the specification and in which:

Figure 1 is a view of the longitudinal section showing a vortex forming means applied to the inlet end of a tube.

Figure 2 is a cross section taken on line II—II of Figure 1.

Figure 3 is a view of a longitudinal section showing another type of vortex forming means applied to the inlet end of a tube.

Figure 4 is a cross section taken along line IV—IV of Figure 3.

Figure 5 is a cross section taken along line V—V of Figure 3.

Figure 6 is a longitudinal section, showing another type of vortex forming means.

Figure 7 is a section taken on line VII—VII of Figure 6.

The tube 1 through which the fluid A is being passed in the form of a free spiral vortex may be a single tube or it may be one of a plurality of tubes in a heat exchanger. The fluid A may have its temperature raised or lowered by absorbing heat from, or releasing heat to, the wall of the tube 1. The fluid A may also be a liquid that is being vaporized by heat absorbed through the wall of the tube or it may be a vapor being condensed by the release of heat to the tube wall.

The tube 1 has a vortex forming means placed at one end. This vortex forming means may be larger than the diameter of the tube and may be secured to the outside of the tube as is illustrated in Figures 1 and 3, or it may be secured to the inside of the tube as illustrated in Figure 6.

In Figures 1 and 2 tangentially arranged guide vanes 2 are mounted between side members 3 and 4. The member 4 has an opening substantially equal to the diameter of the tube and is provided with a flange 5 whereby the vortex forming means may be secured to the tube. As fluid is forced in under a difference of pressure, it is directed by the vanes 2 into the tube 1 such that it will have a rotational component of motion about the axis of the tube. The motion of rotation imparted to the fluid consolidates into a free spiral vortex which is maintained throughout the length of the tube. Any number of vanes may be employed and the vanes may be fixed as illustrated or, if desired, the construction may be modified so that the vanes are adjustable in order to alter the thickness of the annular stream of fluid in the tube.

In the construction shown in Figures 3 and 4 the vortex forming means comprises two side members 7 and 8 and a spirally shaped outer member 6. The member 8 has an opening approximating the diameter of the tube and may be provided with a flange 9 for securing the vortex forming means to the tube. Fluid is introduced under pressure at the inlet 10 and is guided in a circular path by the outer wall 6. The rotational component imparted to the fluid by the wall 6 consolidates into a free spiral vortex motion in the tube which is maintained during the flow of the fluid through the tube.

In Figures 6 and 7 a modification of the vortex forming means is illustrated which consists of two shells 11 and 12 having the form of surfaces of revolution. Guide vanes 13 are placed between the two shells and are shaped so as to impart the required free spiral vortex motion to the fluid as it passes through the tube 1. The member 11 may be provided with an extension 14 which may be inserted into the tube to secure the vortex forming means in proper position.

Any of the vortex forming means described heretofore may be attached to either the outer or inner surfaces of the tube by any suitable means, for example, they may be made to fit snugly and pushed into place, or they may be held into place by screws, rivets, springs, etc., or may be formed integrally with the tube.

Figures 3 and 5 illustrate a diffuser means indicated as two plates 20 and 21, separated but held together by members 22. The plate 20 is provided with an opening approximating the diameter of the tube and a flange 23 for securing the arrangement to the tube.

The fluid may be forced through the tube and the pressure difference necessary to accomplish this may be obtained by any conventional method, such as by natural or forced drafts, gravity, and by means such as pumps, blowers, etc. Such methods and means are entirely conventional and while they are necessary for the formation of the free spiral vortex as utilized in my invention, they do not per se constitute a part of my invention and I do believe it is unnecessary to illustrate the same specifically.

It will be obvious that my invention may be used in many different applications and in many arts, for example, fire and water tubes in boilers, in water heaters and coolers, evaporators, condensers, etc., and I intend my invention to be generic to an application to all the said arts and not limited to the specific examples listed.

It will also be obvious that in applying my invention to these arts, various modifications in the vortex forming means, per se, and the manner in which it is associated with, or secured to the tubular conduit or conduits, will be apparent to those skilled in the art. While I have not illustrated my invention as applied to all of the various arts, or as embodying all of the specific forms of apparatus which may be used, I intend my invention to be generic and include all such modifications as are embraced within the following claims.

I claim:

1. A heat exchange apparatus adapted to alter the heat content of a fluid, comprising a conduit through which the fluid is introduced and passed and through which conduit heat is transferred, means near the inlet end of the conduit for imparting to the fluid the motion of a free spiral vortex as it passes under a pressure differential through said conduit, said means comprising spaced end members substantially perpendicular to the axis of said conduit and an inwardly extending curved member between said end members for imparting a rotational and a radial component to the fluid.

2. In a heat exchange apparatus adapted to alter the heat content of a fluid, comprising a conduit through which the fluid is introduced and passed and through which conduit heat is transferred, means near the inlet end of the conduit for imparting to said fluid the motion of a free spiral vortex as it passes under a pressure differential through said conduit, said means comprising spaced end members substantially perpendicular to the axis of the conduit and a plurality of inwardly curved vane members located between said end members for imparting a rotational and a radial component to the fluid.

3. A heat exchange apparatus adapted to alter the heat content of a fluid, comprising a conduit through which the fluid is passed and through which conduit heat is transferred, means near the inlet end of the conduit for introducing the fluid into the conduit and imparting to it the motion of a free spiral vortex as it passes through said conduit, said means substantially surrounding the inlet opening of the conduit and having entirely around it inwardly curved portions against which the fluid is contacted, whereby there is imparted to the fluid a motion having rotational and radial components prior to its entry into the conduit.

4. A heat exchange apparatus adapted to alter the heat content of a fluid, comprising a conduit through which the fluid is passed and through which conduit heat is transferred, means near the inlet end of the conduit for introducing the fluid into the conduit and imparting to it the motion of a free spiral vortex as it passes through said conduit, said means substantially surrounding the inlet opening of the conduit and having entirely around it a plurality of inwardly curved vanes against which the fluid is contacted, whereby there is imparted to the fluid a motion having rotational and radial components prior to its entry into the conduit.

5. A heat exchange apparatus adapted to alter the heat content of a fluid, comprising a conduit through which the fluid is passed and through which conduit heat is transferred, means near the inlet end of the conduit for introducing the fluid into the conduit and imparting to it the motion of a free spiral vortex as it passes through said conduit, said means substantially surrounding the inlet opening of the conduit and having entirely around it a continuously inwardly curved member against which the fluid is contacted, whereby there is imparted to the fluid a motion having rotational and radial components prior to its entry into the conduit.

6. A heat exchange apparatus adapted to alter the heat content of a fluid, comprising a conduit through which the fluid is passed and through which conduit heat is transferred, means near the inlet end of the conduit for introducing the fluid into the conduit and imparting to it the motion of a free spiral vortex as it passes through said conduit, said means having an end member spaced from the inlet opening of said conduit and portions curved inwardly toward the axis of said conduit and spacing said end member from said conduit, against which portions the fluid is contacted, whereby there is imparted to the fluid a motion having rotational and radial components prior to its entry into the conduit.

7. A heat exchange apparatus adapted to alter the heat content of a fluid, comprising a conduit through which the fluid is passed and through which conduit heat is transferred, means near the inlet end of the conduit for introducing the fluid into the conduit and imparting to it the motion of a free spiral vortex as it passes through said conduit, said means having an end member spaced from the inlet opening of said conduit and a plurality of vanes curved inwardly toward the axis of said conduit and spacing said end member from said conduit, against which vanes the fluid is contacted, whereby there is imparted to the fluid a motion having rotational and radial components prior to its entry into the conduit.

8. A heat exchange apparatus adapted to alter the heat content of a fluid, comprising a conduit through which the fluid is passed and through which conduit heat is transferred, means near the inlet end of the conduit for introducing the fluid into the conduit and imparting to it the motion of a free spiral vortex as it passes through said conduit, said means having an end member spaced from the inlet opening of said conduit and a member continuously curved inwardly toward the axis of said conduit and spacing said end member from said conduit, against which curved member the fluid is contacted, whereby there is imparted to the fluid a motion having rotational and radial components prior to its entry into the conduit.

AATTO P. SAHA.